March 23, 1954 H. HAGE 2,672,949
VACUUM CLEANER
Filed April 13, 1951
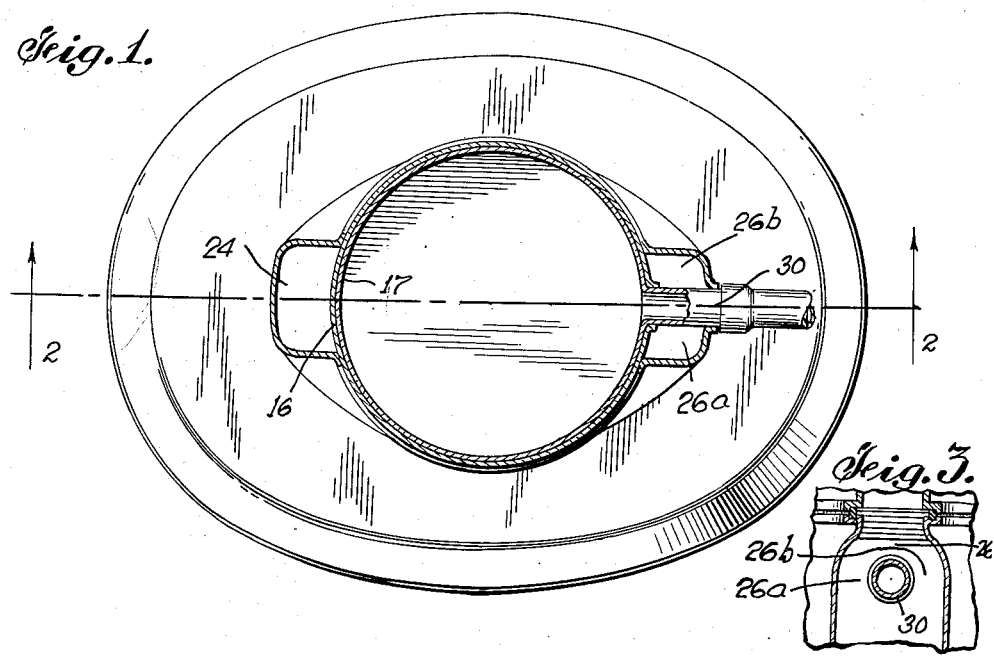
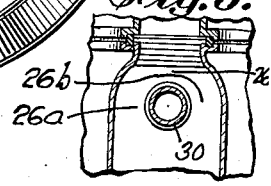
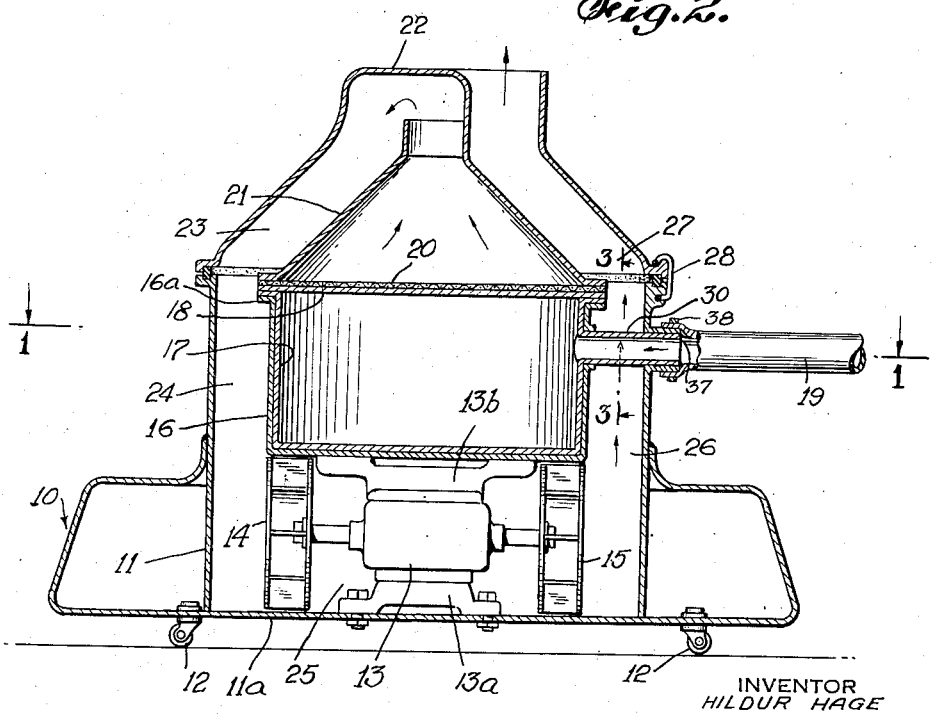
INVENTOR
HILDUR HAGE
BY
Samuel J. Steel
ATTORNEY Patented Mar. 23, 1954

2,672,949

UNITED STATES PATENT OFFICE 2,672,949

VACUUM CLEANER

Hildur Hage, Uniondale, N. Y.

Application April 13, 1951, Serial No. 220,773

3 Claims. (Cl. 183—37)

1

This invention relates to a vacuum cleaner.

The principal object of this invention is the provision of a vacuum cleaner which employs a disposable filter, a disposable dust collecting bag situated opposite said filter, and a supporting frame which carries said bag and said filter in such relative positions that the dust is prevented from collecting against, and thereby clogging, the filter. The current of air which the vacuum cleaner generates must necessarily pass through the filter. Since said current of air carries the dust particles with it, said dust particles are perforce brought into contact with the filter. In many vacuum cleaners the filter is situated at or adjacent the bottom of the dust collecting chamber. The combined action of the air current generated by the vacuum cleaner and gravity tends to collect the dust against the filter, thereby materially reducing the efficiency of the unit. In the present invention the filter is located above the dust collecting bag and the influence of gravity upon the dust particles tends to free them from the filter and to cause them to fall into the dust collecting bag. There are vacuum cleaners wherein the filter is situated above the dust collecting chamber for the reason and purpose last mentioned. But none of these vacuum cleaners is provided with a dust collecting bag of the disposable type to catch the dust particles.

Another important object of this invention is the provision of a vacuum cleaner of the character described which has a base housing in which the electric motor and dust collecting bag are situated and a cover for said base housing which is removable to provide access to said dust collecting bag, as well as to the filter. In other vacuum cleaners in which the filter is situated above the dust collecting chamber, the motor is mounted above the filter. It is necessary, therefore, to remove the entire vacuum cleaner mechanism in order to reach the dust collecting chamber. This is objectionable from an operational point of view since it means that the housewife who uses the vacuum cleaner must lift a combined weight of approximately 25 or 30 pounds or even more every time she empties the dust collecting chamber. In the present invention the vacuum cleaner mechanism is mounted below the dust collecting bag. There is no need to handle said mechanism or the housing in which it is mounted in order to gain access to the dust collecting bag. The housing cover which is removable to expose the dust collecting bag is relatively light in weight and it may very easily be handled by the average housewife.

2

Another object of this invention is the provision of a vacuum cleaner of the character described wherein the filter is either of flat, disc-shape or of conical shape wherein the apex points upwardly. When a flat, disc-shaped filter is used, a correspondingly shaped perforated plate is employed to support said filter. When a conical filter is used, a perforated plate of conical shape is provided to support said conical filter. In either case the perforated plate is supported by the removable cover and when said cover is removed from the base housing and placed upon the floor, the perforated plate is supported a spaced distance above the floor level. In other vacuum cleaners of this general description, a conical filter and a conical perforated filter supporting plate are employed wherein the apex of the filter and of the perforated plate points downwardly. Hence, when cover unit is removed from the base housing and placed upon the floor, the perforated plate encounters the floor, thereby soiling the floor and in turn being soiled by the floor. In this connection, it should be borne in mind that frequently the cover unit is placed not on the floor inside the house but on the ground outside the house. In such instance, the perforated plate would take on the dust or dirt from the ground.

Preferred forms of this invention are shown in the accompanying drawing in which:

Fig. 1 is a horizontal section looking down on the line 1—1 of Fig. 2.

Fig. 2 is a vertical section through the entire vacuum cleaner herein described and claimed, said section being taken on the line 2—2 of Fig. 1.

Fig. 3 is a fragmentary vertical section on line 3—3 of Fig. 2.

Referring now to Figs. 1 and 2 of the drawing, it will be seen that the vacuum cleaner 10 herein claimed comprises the following principal elements: a base housing 11 which is mounted on casters 12, an electric motor 13 which is mounted inside the base housing, on the floor 11a thereof, a pair of impellers 14 and 15 respectively, connected to said motor, a basket or other suitable container 16 mounted within the base housing, above and atop said motor, a dust collecting bag 17 carried within said basket, a disc-shaped filter 18 supported on top of said basket and dust collecting bag, a suction hose 19 communicating with said dust collecting bag, a flat, disc-shaped perforated plate 20 mounted atop the disc-shaped filter, a cone-shaped duct 21 leading upwardly from said perforated plate, a housing cover 22 connected to said conical duct and perforated plate and being itself mounted on the base housing 11, another duct 23 communicating with the conical duct 21 and extending downwardly along the inside wall of said cover 22, a third duct 24 formed within the base housing and communicating at its upper end with duct 23 and at its lower end with a horizontal duct 25 in which the motor and the two impellers are mounted, an exhaust duct 26 communicating at its lower end with the opposite end of horizontal duct 25, a second exhaust duct 27 formed in the cover which communicates at its lower end with the upper end of duct 26 and which communicates at its upper end with the atmosphere, and clamps 28 which fasten the cover to the base housing and maintain duct 23 in alignment with duct 24 and duct 26 in alignment with duct 27. It will be noted in Fig. 1 that duct 26 forks off to form bifurcated duct 26a, 26b in order to straddle tube 30 which connects the suction hose to the dust collecting bag. This bifurcated duct merges above tube 30 to resume its original form and to meet and communicate with the lower end of duct 27.

The tube 30 which provides an inlet for the dust and other foreign particles that may enter the collecting bag 17 extends from one side of the bag through a suitable opening in the side wall of the basket or container 16. The outer open end of this tube projects through a flanged tubular portion formed on the adjacent side wall of the housing or casing 11. This flanged tubular portion is indicated at 37 and clamped around this flanged portion is the discharge end of the suction hose 19, by any suitable clamping means indicated at 38.

It will be understood that the construction of the vacuum cleaner herein described and claimed is intended merely to illustrate the basic principles of the invention and not to constitute a fixed blueprint design. For example, it may be found desirable from a manufacturing point of view to make the base housing a two-piece construction rather than a one piece or a unitary construction as shown in the drawing. Thus the floor of the base housing may comprise a separate and independent entity which is fastened to the side wall or walls of the housing rather than an integral part thereof. The remarks which follow should therefore be considered in this light.

One of the important features of the invention is its wall construction wherein some of the walls or parts of some of the walls perform dual functions. Thus portions of the walls of the cover 22 serve as walls of ducts 23 and 27. Portions of the walls of the base housing serve also as walls of ducts 24 and 26. The floor of the base housing serves at least in part as one of the walls of duct 25. The walls of basket 16 as well as its floor serve also, in part, as the walls of ducts 24, 26 and 25. Portions of the walls of cone-shaped duct 21 serve as walls for ducts 23 and 27. This is clearly shown in Fig. 2.

Another important feature of this invention is the manner in which the dust collecting bag is supported. It will be noted that the motor has a base 13a by which it is supported on the floor of the base housing. The motor is also provided with a somewhat equivalent base structure 13b on its top side which supports basket 16 in a substantially central position in the base housing. The basket is shaped to receive the disposable dust collecting bag which should be made, preferably, of paper. The basket is provided with an outwardly extending peripheral flange 16a which is adapted to support the peripheral edge of the filter. The filter should be made of any suitable material but preferably it should be made of disposable filter paper. When the housing cover is clamped to the housing by means of clamps 28, the peripheral edge of the perforated plate rests upon the peripheral edge of the filter and presses it against the peripheral flange of the basket. In this manner an air tight seal is provided along the entire peripheral edge of the filter, on both sides thereof.

The foregoing is illustrative of the general principles of this invention and it will be understood that the specific construction shown in the drawing is susceptible of many variations and modifications within the broad scope and spirit of the invention. For example, the dust filter may be provided in two ways: It may be permanently affixed to the peripheral edge of the open top of the dust collecting bag to form a single, integral unit therewith. It may also constitute a separate and independent member which is simply held in place upon the flanged top end of the dust collecting bag by means of the perforated metal plate. Another example is the use of a single impeller in place of the two impellers shown in the drawing. The question of whether a single impeller or two impellers should be incorporated into the vacuum cleaner is a question of engineering and design which the manufacturer will decide for himself.

I claim:

1. A vacuum cleaner comprising a casing open at its top, an open top basket arranged centrally in said casing, said basket being spaced from the sides of the casing and also from the bottom thereof, a motor arranged beneath the basket, a suction fan carried by the motor, an open top dust receiving bag removably mounted in said basket, an inlet pipe extending through the side walls of the casing and basket and communicating at its inner end with the interior of the bag, a dust filter extending across the top of the bag, a conical duct member mounted on the top of the basket and being open at its top, a vertical duct formed between the side walls of the casing and the basket, said suction fan having communication with the bottom of said vertical duct, and a removable cover secured on the top of the casing and being connected to said conical duct member to form a duct therewith that affords communication between the open top of the conical duct member and the top of said vertical duct, and means for exhausting the air from the bottom of the casing.

2. A vacuum cleaner comprising a casing open at its top, an open top basket arranged centrally in said casing, said basket being spaced from the sides of the casing and also from the bottom thereof, vertical suction and exhaust forming ducts formed between the side walls of the casing and the basket, a motor arranged beneath the basket, a suction fan connected to one side of the motor for disposition at the bottom of one of the vertical ducts, an exhaust fan connected to the other side of the motor for disposition at the bottom of the other vertical duct, an open top dust collecting bag removably mounted in said basket, an inlet pipe extending through the sides of the casing and basket and communicating at its inner end with the interior of the bag, a dust filter extending across the top of the basket, a conical member seated on the top of the basket, the top of said conical member being open, and a removable cover secured on the top of the casing and being formed with a pair of ducts, one of said ducts affording communication between the open top of the conical member and the top of the vertical suction forming duct, the other duct in the cover being open to the atmosphere at the top of the cover and at its lower end communicating with the top of the exhaust forming vertical duct.

3. A vacuum cleaner comprising a casing open at its top, an open top basket arranged centrally in said casing, said basket being spaced from the sides of the casing and also from the bottom thereof, a motor arranged beneath the basket, a suction fan carried by the motor, an open top dust receiving bag removably mounted in said basket, an inlet pipe extending through the side walls of the casing and basket and communicating at its inner end with the interior of the bag, a dust filter extending across the top of the bag, a conical duct member mounted on the top of the basket and being open at its top, a vertical duct formed between the side walls of the casing and the basket, said suction fan having communication with the bottom of said vertical duct, and a removable cover secured on the top of the casing and being connected to said conical duct member to form a duct therewith that affords communication between the open top of the conical duct member and the top of said vertical duct.

HILDUR HAGE.

References Cited in the file of this patent

UNITED STATES PATENTS

| Number | Name | Date |
|---|---|---|
| 963,139 | Griffiths | July 5, 1910 |
| 996,691 | Wallace | July 4, 1911 |
| 1,133,543 | Duffie | Mar. 30, 1915 |
| 1,356,061 | Frank | Oct. 19, 1920 |
| 2,025,946 | Wenner-Gren | Dec. 31, 1935 |
| 2,388,279 | Nuffer et al. | Nov. 6, 1945 |
| 2,616,517 | Beck | Nov. 4, 1952 |

FOREIGN PATENTS

| Number | Country | Date |
|---|---|---|
| 245,131 | Germany | Mar. 27, 1912 |
| 717,005 | France | Oct. 13, 1931 |